(12) United States Patent
Yamada et al.

(10) Patent No.: US 6,842,353 B2
(45) Date of Patent: Jan. 11, 2005

(54) SWITCHING POWER SUPPLY, AND A METHOD OF DRIVING THE SAME

(75) Inventors: Tomoyasu Yamada, Niiza (JP); Masaaki Simada, Niiza (JP)

(73) Assignee: Sanken Electric Co., Ltd. (JP)

( * ) Notice: Subject to any disclaimer, the term of this patent is extended or adjusted under 35 U.S.C. 154(b) by 0 days.

(21) Appl. No.: 10/855,030

(22) Filed: May 27, 2004

(65) Prior Publication Data

US 2004/0218410 A1 Nov. 4, 2004

Related U.S. Application Data

(63) Continuation of application No. PCT/JP02/12589, filed on Dec. 2, 2002.

(30) Foreign Application Priority Data

Dec. 3, 2001 (JP) ........................................ 2001-369269

(51) Int. Cl.[7] ............................................. H02M 3/156
(52) U.S. Cl. ............................. 363/89; 363/97; 323/271
(58) Field of Search ............................... 363/80, 81, 89, 363/95, 97; 323/271

(56) References Cited

U.S. PATENT DOCUMENTS

| 4,964,029 A | * | 10/1990 | Severinsky et al. ............ 363/80 |
| 4,974,141 A | * | 11/1990 | Severinsky et al. ............ 363/81 |
| 5,515,257 A | * | 5/1996 | Ishii ............................. 363/21.1 |
| 5,991,172 A | * | 11/1999 | Jovanovic et al. .......... 363/21.14 |

FOREIGN PATENT DOCUMENTS

| JP | 06-086537 | 3/1994 |
| JP | 06-339267 | 12/1994 |
| JP | 07-274528 | 10/1995 |
| JP | 10-127083 | 5/1998 |
| JP | 10-127094 | 5/1998 |
| JP | 10-248255 | 9/1998 |

* cited by examiner

Primary Examiner—Adolf Berhane
(74) Attorney, Agent, or Firm—Woodcock Washburn LLP

(57) ABSTRACT

A switching power supply comprising an a.c.-to-d.c. converter circuit for connection to a source of commercial alternating current, and a d.c.-to-d.c. converter circuit for translating the d.c. output voltage of the a.c.-to-d.c. converter into desired d.c. voltage for application to a load. The d.c.-to-d.c. converter circuit is set into operation only after the output voltage of the a.c.-to-d.c. converter circuit has built up sufficiently, in order to preclude instability in the output voltage of the power supply during a startup period.

16 Claims, 11 Drawing Sheets

US 6,842,353 B2

SWITCHING POWER SUPPLY, AND A METHOD OF DRIVING THE SAME

RELATED APPLICATIONS

This is a continuation of International Application No.PCT/JP02/12589 filed Dec. 2, 2002, which claims priority to Japanese Patent Application No.2001-369269 filed Dec. 3, 2001.

BACKGROUND OF THE INVENTION

This invention relates to electric power supplies, and particularly to a switching power supply capable of a.c. to d.c. voltage conversion, featuring provisions for attainment of a higher power factor, and to a method of driving the switching power supply.

The d.c.-to-d.c. converter in general employs as its source of d.c. voltage an a.c.-to-d.c. converter circuit for connection mostly to a commercial a.c. power supply. A conversion from an alternating to a direct current is possible by a combination of a rectifying circuit having a diode connected to an a.c. power supply, and a smoothing capacitor connected to the rectifying circuit. This type of rectifying and smoothing circuit possesses the disadvantage of a low power factor as a result of the fact that the smoothing capacitor is charged only at or adjacent the peaks of the incoming a.c. voltage of sinusoidal waveform. Another drawback is that it is in capable of adjustably varying the d.c. output voltage.

The concept of reconstructing the a.c.-to-d.c. converter circuit for a higher power factor is itself not new in the art. It has been suggested, for example, to connect an electronic switch between the pair of outputs of the rectifier circuit via an inductor, and to connect the smoothing capacitor in parallel with the switch via a diode. The switch is driven at a repetition frequency (e.g. 20 kHz) that is higher than the frequency (e.g. 50 Hz) of the input a.c. voltage. The inductor is connected between the outputs of the rectifier circuit during the conducting periods of the switch, with consequent current flow therethrough. The peak value of the current through the inductor varies in proportion with the instantaneous value of the sinusoidal a.c. voltage. A higher power factor is attained as the current at the input stage of the rectifier circuit more closely approximates a sinusoidal wave.

As an additional outcome of the power factor improvement of the a.c.-to-d.c. converter circuit, the smoothing capacitor is charged by the resultant of the output voltage of the rectifier circuit and the inductor voltage during the nonconducting periods of the switch. The smoothing capacitor is thus charged to a voltage higher than the output voltage of the rectifier circuit.

There has, however, been a problem left unsolved with the switching power supply comprising an a.c.-to-d.c. converter circuit with an improved power factor, and a d.c.-to-d.c. converter circuit utilizing the a.c.-to-d.c. converter circuit as power supply. The problem arose from the fact that the switch in the a.c.-to-d.c. converter circuit and that in the d.c.-to-d.c. converter circuit started to be driven practically simultaneously when the smoothing capacitor in the a.c.-to-d.c. converter was charged to a certain level. This may be restated that the switch in the d.c.-to-d.c. converter circuit started to be driven before commencement of the step-up charging of the smoothing capacitor due to the on-off operation of the switch in the a.c.-to-d.c. converter circuit. The possible result was an insufficient supply of input voltage to the d.c.-to-d.c. converter circuit. The output voltage of the d.c.-to-d.c. converter circuit sometimes failed to rise to the required level, causing trouble in the operation of the load to the required level, causing trouble in the operation of the load connected thereto in the worst case.

It might be contemplated to make the smoothing capacitor in the a.c.-to-d.c. converter circuit large enough in capacity to alleviate the inconvenience pointed out above. This solution is objectionable because of a costly and bulky smoothing capacitor required, which adds substantively to the cost and size of the power supply itself.

SUMMARY OF THE INVENTION

The present invention has it as an object to stabilize the startup voltage of the d.c.-to-d.c. converter circuit.

Briefly, the invention may be summarized as a switching power supply capable of translating a.c. voltage into d.c. voltage, comprising an a.c.-to-d.c. converter circuit connected to a pair of a.c. input terminals for translating the input a.c. voltage into d.c. voltage, and a d.c.-to-d.c. converter circuit connected to the a.c.-to-d.c. converter circuit for translating the d.c. voltage output therefrom into desired d.c. voltage for application to a load. The a.c.-to-d.c. converter circuit incorporates power factor improvement means including an a.c.-to-d.c. converter switch. A first switch control circuit is connected to the a.c.-to-d.c. converter switch for driving the same at a repetition frequency higher than the frequency of the input a.c. voltage. A second switch control circuit is connected to a d.c.-to-d.c. converter switch for driving the same at a repetition frequency higher than the frequency of the input a.c. voltage. A voltage detector circuit is connected to the a.c.-to-d.c. converter circuit for providing a voltage output indicative of the d.c. voltage output from the a.c.-to-d.c. converter circuit. A voltage decision circuit is connected to the voltage detector circuit a.c.-to-d.c. converter circuit for ascertaining whether the d.c. voltage output therefrom is higher than a predefined value or not. Connected to the voltage decision circuit and the second switch control circuit, a starter circuit functions to cause the second switch control circuit to start driving the d.c.-to-d.c. converter switch when the voltage output from the voltage detector circuit grows higher than the predefined value.

The starter circuit is connected to the voltage decision circuit and the second switch control circuit for causing the second switch control circuit to start driving the d.c.-to-d.c. converter switch when the voltage output from the voltage detector circuit grows higher than the predefined value. Thus the d.c.-to-d.c. converter circuit starts production of stable d.c. voltage after the startup period when there may be an undersupply of voltage from the a.c.-to-d.c. converter circuit. Therefore, the startup voltage of the d.c.-to-d.c. converter circuit is stabilized.

The above and other objects, features and advantages of this invention will become more apparent, and the invention itself will best be understood, from a study of the following detailed description and appended claims, with reference had to the attached drawings showing the preferred embodiments of the invention.

DESCRIPTION OF THE PREFERRED EMBODIMENTS

Figure 1:
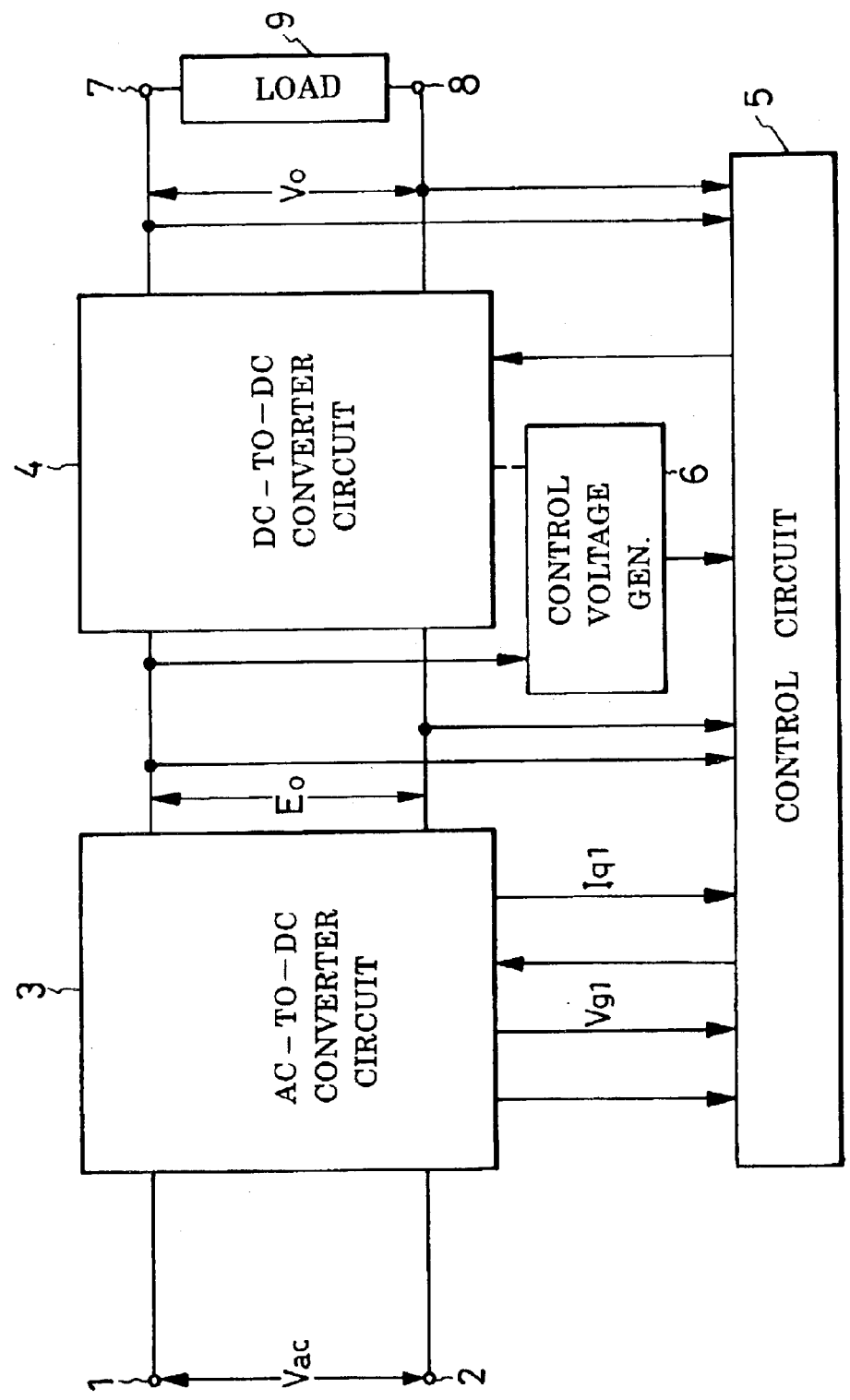
FIG. 1 is a block diagram of a first preferred form of switching power supply according to the invention.

The first preferred form of switching power supply according to the instant invention may be considered to be broadly configured as depicted block-diagrammatically in FIG. 1. It is therein shown divided into: (a) an a.c.-to-d.c. converter circuit 3 connected to a pair of input terminals 1 and 2 for translating the input a.c. voltage $V_{ac}$ into a d.c. voltage $E_0$ with an improved power factor; (b) a d.c.-to-d.c. converter circuit 4 connected between the a.c.-to-d.c. converter circuit 4 and a pair of output terminals 7 and 8 for translating the d.c. voltage $E_0$ into a desired d.c. output voltage to be applied to a load 9 connected between the pair of output terminals; (c) a control circuit 5 for controllably driving switches, to be set forth subsequently, that are included in the a.c.-to-d.c. converter circuit 3 and in the d.c.-to-d.c. converter circuit 4, according to the novel concepts of this invention; and (d) a control voltage generator circuit 6 for producing a control voltage that is needed by the control circuit 5, the control voltage being derived from both the a.c.-to-d.c. converter output voltage $E_0$ and a voltage from a transformer, to be set forth subsequently, that is included in the d.c.-to-d.c. converter circuit 4.

Figure 2:
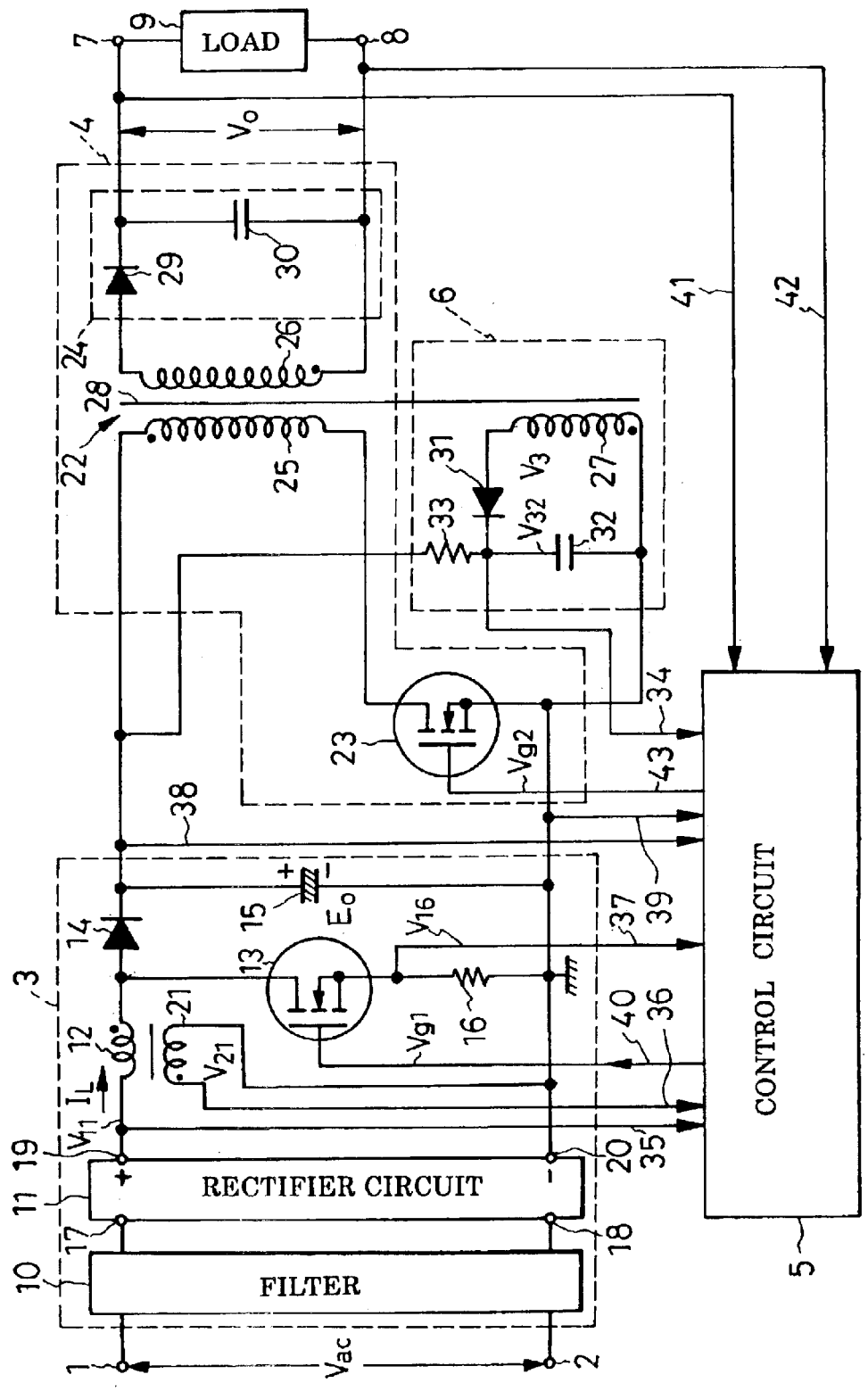
FIG. 2 is a schematic electrical diagram, partly in block form, showing the FIG. 1 device in more detail.

Reference may be had to FIG. 2 for a more detailed study of the a.c.-to-d.c. converter circuit 3, d.c.-to-d.c. converter circuit 4, and control voltage generator circuit 6. The a.c.-to-d.c. converter circuit 3 has a noise filter 10 connected to the pair of input terminals 1 and 2 for elimination of high frequency component noise that is created as the input a.c. voltage $V_{ac}$ is switched. The noise filter 10 can be of conventional make comprising an inductor and a capacitor, both not shown. This filter will be unnecessary in cases where the high frequency noise poses no problem for the supply side of the input terminals 1 and 2. An equivalence of the noise filter 10 may be provided as required or desired on the output side of a rectifier circuit 11 to which the noise filter is connected.

Of the familiar full-wave design having four diodes in bridge connection, the rectifier circuit 11 has a pair of input terminals 17 and 18 connected to the noise filter 10, and a pair of output terminals 19 and 20 for providing a full-wave rectification of the sinusoidal a.c. input voltage. The first rectifier output 19 is connected an inductor or coil 12 and thence to a switch 13. Another coil 21 is provided which is electromagnetically coupled to the inductor 12 and which is connected to the control circuit 5 for informing the same of a voltage across the inductor. The second rectifier output 20 is grounded.

Shown as an insulated-gate field-effect transistor, the switch 13 has its drain connected to the first rectifier output 19 via the inductor 12, its source connected to the second rectifier output 20 via a current-detecting resistor 16, and its gate to the control circuit 5.

A smoothing capacitor 15 is connected in parallel with the switch 13 via a rectifying diode 14 and the current-detecting resistor 16. Charged both by the output from the rectifier circuit 11 and by the energy stored on the inductor 12, the smoothing capacitor provides the voltage $E_0$ as the output from this a.c.-to-d.c. converter circuit 3. This voltage $E_0$ is applied to the d.c.-to-d.c. converter circuit 4.

The d.c.-to-d.c. converter circuit 4 includes a transformer 22 having a primary winding 25, a secondary winding 26 and a tertiary winding 27, which are all electromagnetically coupled together via a magnetic core 28, and are electrically insulated each other. The three transformer windings 25–27 are polarized as indicated by the dots in FIG. 2, so that, for instance, the transformer primary 25 and secondary 26 are opposite in polarity. The transformer primary 25, which has leakage inductance, has one extremity thereof connected to one of the opposite polarity terminals of the smoothing capacitor 15, and another extremity connected to the drain of an insulated-gate field-effect-transistor switch 23. This switch 23 of the d.c.-to-d.c. converter circuit 4 will be hereinafter referred to as the d.c.-to-d.c. converter switch in contradistinction from the switch 13 of the a.c.-to-d.c. converter circuit 3, which will then be hereinafter referred to as the a.c.-to-d.c. converter switch. The source of the d.c.-to-d.c. converter switch 23 is connected to the other terminal of the smoothing capacitor 15. The transformer primary 25 is therefore connected in parallel with the smoothing capacitor 15 via the d.c.-to-d.c. converter switch 23.

The transformer secondary 26 has its pair of opposite extremities connected respectively to the pair of output terminals 7 and 8 via a rectifying and smoothing circuit 24. This circuit 24 comprises a rectifying diode 29 and a smoothing capacitor 30, with the smoothing capacitor connected in parallel with the transformer secondary 26 via the rectifying diode. The rectifying diode 29 is to conduct upon development of a voltage across the transformer secondary 26 during each nonconducting period of the d.c.-to-d.c. converter switch 23. That is to say that the d.c.-to-d.c. converter circuit 4 is of flyback construction.

The control voltage generator circuit 6 as the control power source comprises a rectifying diode 31, a smoothing capacitor 32, and a starting resistor 33, in addition to the noted tertiary winding 27 of the transformer 22. The smoothing capacitor 32 is connected in parallel with the transformer tertiary 27 via the rectifying diode 31. The rectifying diode 31 is so oriented as to conduct in response to a voltage developing across the transformer tertiary 27 during the nonconducting periods of the d.c.-to-d. converter switch 23.

The smoothing capacitor 32 is further connected in parallel with the smoothing capacitor 15 of the a.c.-to-d.c. converter circuit 3 via the starting resistor 33. The smoothing capacitor 32 can therefore be charged via the starting resistor 33 prior to the beginning of operation of the d.c.-to-d.c. converter circuit 4. The smoothing capacitor 32 is additionally connected to a supply terminal of the control circuit 5 by way of a conductor 34.

FIG. 2 further illustrates how the control circuit 5 is connected to the other parts of this switching power supply. The first output 19 of the rectifier circuit 11 is connected by way of a conductor 35 to the control circuit 5 for applying thereto a voltage resulting from full-wave rectification of the input a.c. voltage $V_{ac}$. The noted voltage-detecting coil 21 is electromagnetically coupled as aforesaid to the inductor 12 in order to assist in ascertainment of the completion of energy release from the inductor. The voltage-detecting coil 21 has one extremity thereof connected to the control circuit 5 by way of a conductor 36, and the other extremity to the grounded second output 20 of the rectifier circuit. The junction between a.c.-to-d.c. converter switch 13 and current-detecting resistor 16 is also connected to the control circuit 5 by way of a conductor 37. The smoothing capacitor 15 has its pair of opposite polarity terminals both connected to the control circuit 5 by way of conductors 38 and 39 for application of the smoothing capacitor voltage $E_0$ thereto.

The control circuit 5 has an output connected to the gate of the a.c.-to-d.c. converter switch 13 by way of a conductor 40 for controllably driving the same, and another output connected to the gate of the d.c.-to-d.c. converter switch 23 by way of a conductor 43 for controllably driving the same. The d.c. output voltage $V_0$ must also be detected for controlling the d.c.-to-d.c. converter switch 23 accordingly. The pair of d.c. output terminals 7 and 8 are therefore connected to the control circuit 5 by way of conductors 41 and 42.

Figure 3:
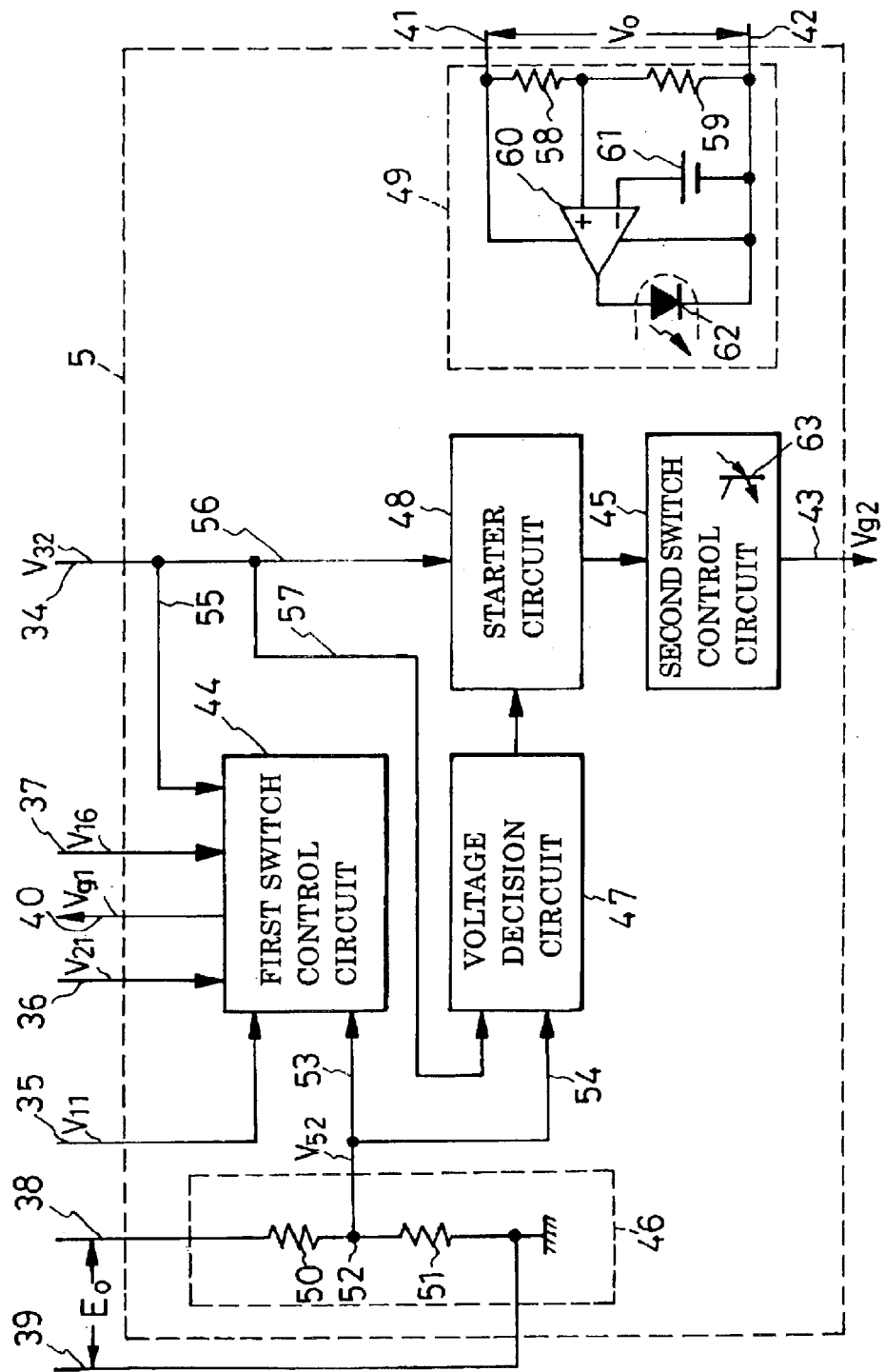
FIG. 3 is a schematic electrical diagram, partly in block form, showing the control circuit of the FIG. 1 embodiment in more detail.

FIG. 3 is a more detailed illustration of the control circuit 5. Although this figure is still block-diagrammatic, it will nevertheless be seen that the control circuit 5 comprises: (a) a first switch control circuit 44 for controllably driving the a.c.-to-d.c. converter switch 13; (b) a second switch control circuit 45 for controllably driving the d.c.-to-d.c. converter switch 23; (c) a voltage detector circuit 46 for detecting the voltage $E_0$ across the smoothing capacitor 15, FIG. 2; (d) a voltage decision circuit 47; (e) a starter circuit 48 for setting the d.c.-to-d.c. converter circuit 4 into operation at an optimal moment determined according to the instant invention; and (f) an output voltage detector circuit 49 for detection of the d.c. output voltage $V_0$ of this switching power supply. The first switch control circuit 44 is shown in detail in FIG. 4, and the second switch control circuit 45, voltage decision circuit 47 and starter circuit 48 in FIG. 5. The following continued discussion of FIG. 3, as well as the subsequent detailed description of FIGS. 4 and 5, will be better understood by referring also to FIGS. 6 and 7 which show the waveforms appearing at various parts of FIGS. 2–5.

With continued reference to FIG. 3 the voltage detector circuit 46 is shown as a serial connection of two voltage-dividing resistors 50 and 51, which is connected to the pair of opposite polarity terminals of the smoothing capacitor 15 by way of the conductors 38 and 39. Therefore, at the junction 52 between the voltage-dividing resistors 50 and 51, there will be obtained a voltage $V_{52}$, seen at (C) in FIG. 6, as a result of the division of the smoothing capacitor voltage $E_0$, (A) in FIG. 6, by the resistors 50 and 51. This fraction $V_{52}$ of the smoothing capacitor voltage $E_0$ is applied both to the first switch control circuit 44 by way of a line 53 and to the voltage comparator circuit 47 by way of a line 54.

The voltage comparator circuit 47 compares the smoothing capacitor voltage fraction $V_{52}$ with a predetermined reference voltage, triggering off the starter circuit 48 when the voltage fraction exceeds the reference voltage, as will be detailed subsequently. The starter circuit 48 functions to connect and disconnect the output conductor 34 of the control voltage generator circuit 6, FIG. 2, to and from the second switch control circuit 45. The control voltage conductor 34 is connected to the first switch control circuit 44 by way of a conductor 55, to the starter circuit 48 by way of a conductor 56, and to the voltage comparator circuit 47 by way of a conductor 57.

The output voltage detector circuit 49 includes two voltage-dividing resistors 58 and 59 interconnected in series between the pair of output terminals 7 and 8, FIG. 2, via the conductors 41 and 42. The junction between these voltage-dividing resistors is connected to one input of a differential amplifier 60, the other input of which is connected to a reference voltage source 61. The differential amplifier 60 puts the difference between the predetermined fraction of the power supply output voltage $V_0$ and the reference voltage from the source 61. The output of the differential amplifier 60 is connected to the conductor 42 via a light-emitting diode 62, which provides an optical output with an intensity proportional to the input voltage and hence to the power supply output voltage $V_0$.

Optically coupled to the LED 62 of the output voltage detector circuit 49 is a phototransistor included in the second switch control circuit 45, as indicated at 63 in FIG. 3. This optical coupling is desirable in cases where the input and output sides of the transformer 22, FIG. 2, must be electrically separated from each other. In the absence of such requirement, of course, the output voltage detector circuit 49 may be electrically coupled to the second switch control circuit 45. In either case the output voltage detector circuit 49 may be considered part of the second switch control circuit 45.

Figure 4:
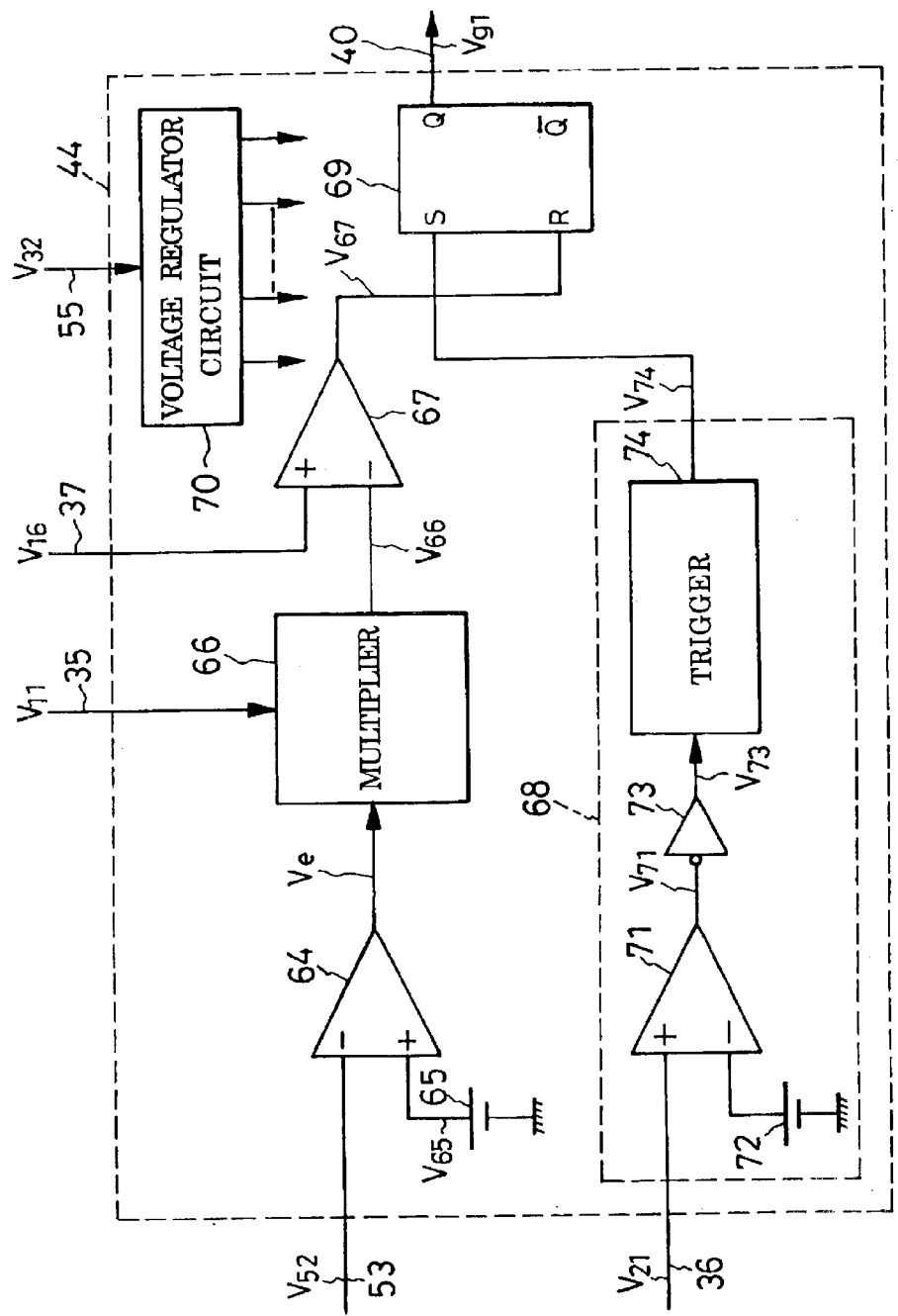
FIG. 4 is a block diagram showing the first switch control circuit of the FIG. 3 control circuit in more detail.

FIG. 4 shows the first switch control circuit 44 of the control circuit 5 in more detail, which functions to hold constant the voltage $E_0$ across the smoothing capacitor 15. The first switch control circuit 44 includes a differential amplifier 64 having a first input connected to the input conductor 53, and a second input to a reference voltage source 65. The output $V_e$ from this differential amplifier 64 is therefore the difference between the fraction $V_{52}$ of the smoothing capacitor voltage $E_0$ and the reference voltage $V_{65}$ from the source 65. The output $V_e$ of the differential amplifier 64 shows the amount of compensation of the smoothing capacitor voltage $E_0$.

Figure 7:
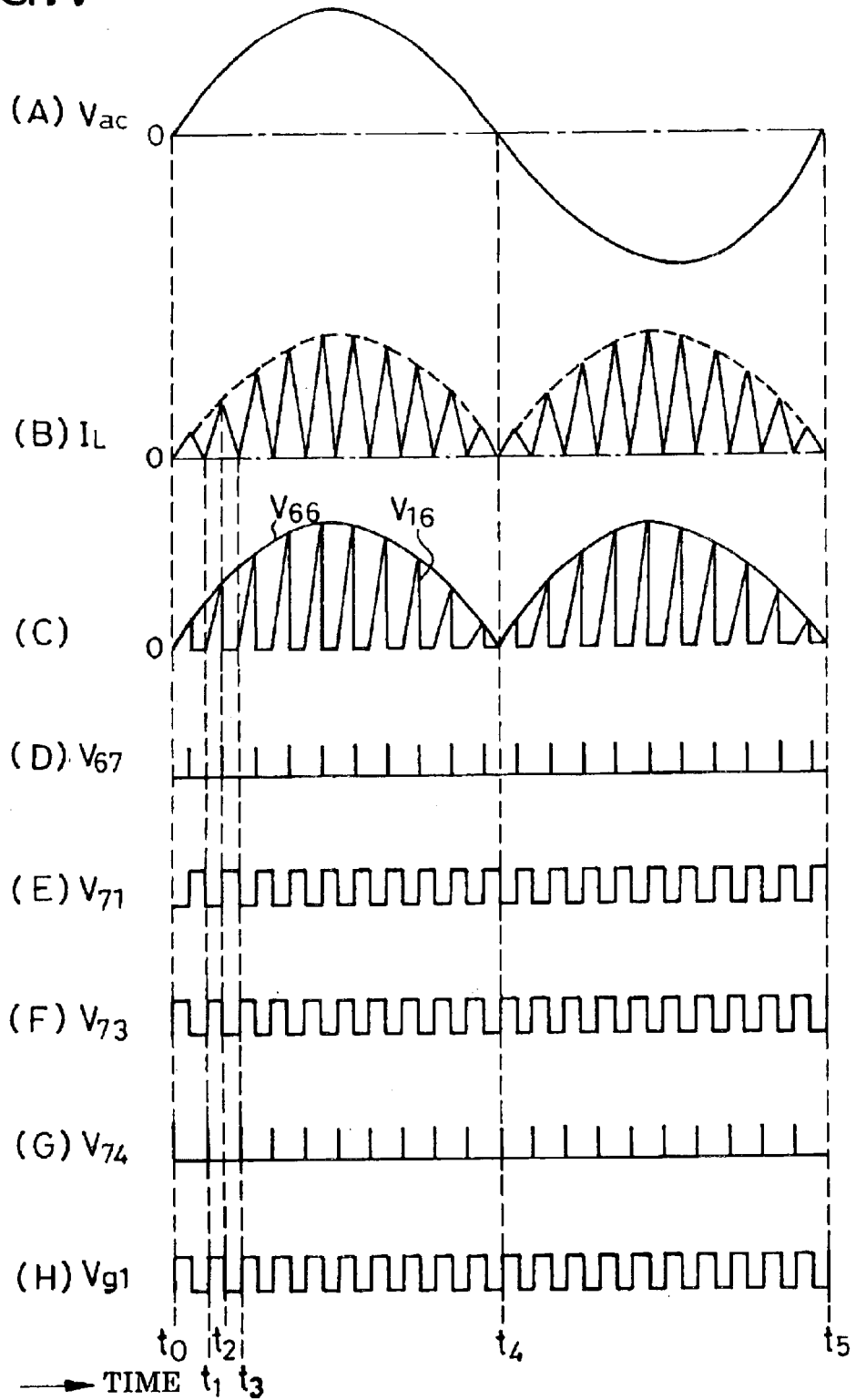
FIG. 7, consisting of (A) through (H), is a series of diagrams showing the waveforms appearing at various parts of FIGS. 2 and 4.

The output $V_e$ from the differential amplifier 64 is applied to a multiplier 66 as compensation means, to which there is also applied the rectifier output $V_{11}$, a full-wave rectification of the incoming sinusoidal a.c. voltage $V_{ac}$, (A) in FIG. 7, by the rectifier circuit 11. Notwithstanding the showing of FIG. 4, however, only a prescribed fraction of the rectifier output $V_{11}$ could be applied to the multiplier 66. As an additional alternative to the FIG. 4 configuration, an additional rectifier circuit might be interposed between the input terminal pair and the multiplier 66, for application of the output from this additional rectifier circuit to the multiplier in lieu of the output from the rectifier circuit 11. The conductor 35 is voltage detector means.

As indicated at (C) in FIG. 7, the resulting output $V_{66}$ from the multiplier 66 will have a waveform resulting from full-wave rectification of the sinusoidal wave. This multiplier output $V_{66}$ is indicative of the target value of the current to be applied to the a.c.-to-d.c. converter switch 13, FIG. 2. The output $V_{66}$ from the multiplier 66 is applied to a negative input of a comparator 67, the positive input of which is connected to the conductor 37 to receive the voltage $V_{16}$ across the current-detecting resistor 16, FIG. 2, of the a.c.-to-d.c. converter circuit 3. Comparing the two inputs $V_{16}$ and $V_{66}$, both shown at (C) in FIG. 7, the comparator 67 will put out a voltage signal $V_{67}$ as at (D) in FIG. 7.

Referring temporarily back to FIG. 2, the current $I_L$ through the inductor 12 will vary in magnitude as at (B) in FIG. 7 according to whether the a.c.-to-d.c. converter switch 13 is on or off, rising with gradient during each conducting period of the switch, as from $t_1$ to $t_2$ in FIG. 7, and diminishing with gradient during each nonconducting period thereof, as from $t_2$ to $t_3$ in FIG. 7. Thus the inductor 12 will store energy during the conducting periods of the a.c.-to-d.c. converter switch 13 and liberate it during its nonconducting periods. The smoothing capacitor 15 will therefore be charged through the path comprising the rectifier circuit 11, inductor 12, and rectifying diode 14 during the nonconducting periods of the a.c.-to-d.c. converter switch 13. Since the peak value of the current $I_L$ through the inductor 12 varies in conformity with the sinusoidal wave, the waveform of the incoming alternating current will closely approximate that of the sinusoidal wave, resulting in improvement in power factor.

Flowing during the conducting periods of the a.c.-to-d.c. converter switch 13, the current through the current-detecting resistor 16 will have a sawtooth waveform. The voltage $V_{16}$ applied over the conductor 37 to the comparator 67, FIG. 4, of the first switch control circuit 44 will develop with gradient during each conducting period of the a.c.-to-d.c. converter switch 13 as at (C) in FIG. 7. The output $V_{67}$ from the comparator 67 will go high when the voltage $V_{16}$ grows higher than the output voltage $V_{66}$ of the multiplier 66, as at (D) in FIG. 7.

The comparator 67 has its output connected to the reset input R of a flip-flop 69. The noninverting output Q of the flip-flop 69 is connected to the gate of the a.c.-to-d.c converter switch 13 by way of a conductor 40 for delivery of a switch control signal $V_{g1}$ thereto. The flip-flop 69 will be reset each time the comparator output $V_{67}$ goes high, with the result that the switch control signal $V_{g1}$ goes low, as at (H) in FIG. 7, to cause non-conduction through the a.c.-to-d.c. converter switch 13. Current flow through this switch will discontinue as at $t_2$ in FIG. 7.

Connected to the set input S of the flip-flop 69 is an a.c.-to-d.c. converter switch conduction-initiating circuit 68 which also is included in the FIG. 4 first switch control circuit 44. This conduction-initiating circuit 68 includes a comparator 71 having a positive input connected to the voltage-detecting coil 21, FIG. 2, of the a.c.-to-d.c. converter circuit 3 by way of a conductor 36. The negative input of the comparator 72 is connected to a reference voltage source 72. The voltage across the voltage-detecting coil 21 varies with that across the inductor 12, which in turn depends upon the current $I_L$ flowing through the inductor as at (B) in FIG. 7. The voltage across the inductor 12 is oriented in one direction during the conducting periods of the a.c.-to-d.c. converter switch 13, and in a direction opposite to said one direction during the nonconducting periods of that switch when current flows owing to energy liberation from the inductor 12. The voltage across the inductor 12 will drop to zero upon completion of energy liberation from the inductor 12. The voltage $V_{21}$ across the voltage-detecting coil 21 is positive during energy release from the inductor 12 and goes negative following the completion of the energy release.

The reference voltage from the source 72 is preset at zero or at a value close to zero. Thus, as will be understood from an inspection of both (B) and (E) in FIG. 7, the output $V_{71}$ from the comparator 71 will go low when the current $I_L$ through the inductor 12 falls to zero or close to zero.

Connected to the output of the comparator 71 is a NOT circuit 73 which puts out a phase inversion $V_{73}$, (F) in FIG. 7, of the comparator output $V_{71}$. This NOT circuit output $V_{73}$ is directed into a trigger circuit 74 which in practice may take the form of either a monostable multivibrator or a differentiator, providing a series of trigger pulses $V_{74}$, (G) in FIG. 7, in synchronism with the leading edges of the NOT circuit output pulses $V_{73}$.

The trigger circuit 74, the final-stage element of the conduction-initiating circuit 68, is connected to the set input S of the flip-flop 69. The reset input R of the flip-flop 69 is connected as aforesaid to the comparator 67 to input the reset pulses $V_{67}$ given at (D) in FIG. 7. In response to these trigger pulses $V_{74}$ and reset pulses $V_{67}$, the flip-flop 69 will put out the a.c.-to-d.c. converter switch control signal $V_{g1}$, at (H) in FIG. 7, which goes high as at $t_0$, $t_1$, and $t_3$ in FIG. 7 and low as at $t_2$ in the same figure. The frequency (e.g. 20–100 kHz) of the a.c.-to-d.c. converter switch control signal $V_{g1}$ is higher than the frequency (e.g. 50 Hz) of the a.c. voltage $V_{ac}$ of the input terminals 1 and 2.

Also shown included in the first switch control circuit 44 of FIG. 4 is a voltage regulator circuit 70 which is connected by way of an input conductor 55 to the control voltage generator circuit 6, FIG. 2. The voltage regulator circuit 70 is intended to power the reference voltage sources 65 and 72, differential amplifier 64, multiplier 66, comparators 67 and 71, flip-flop 69, NOT circuit 73, and trigger circuit 74 of the first switch control circuit 44. The control voltage $V_{32}$ may be fed directly to all the listed components of the first switch control circuit 44 in cases where they do not require the voltage regulator circuit 70.

Figure 6:
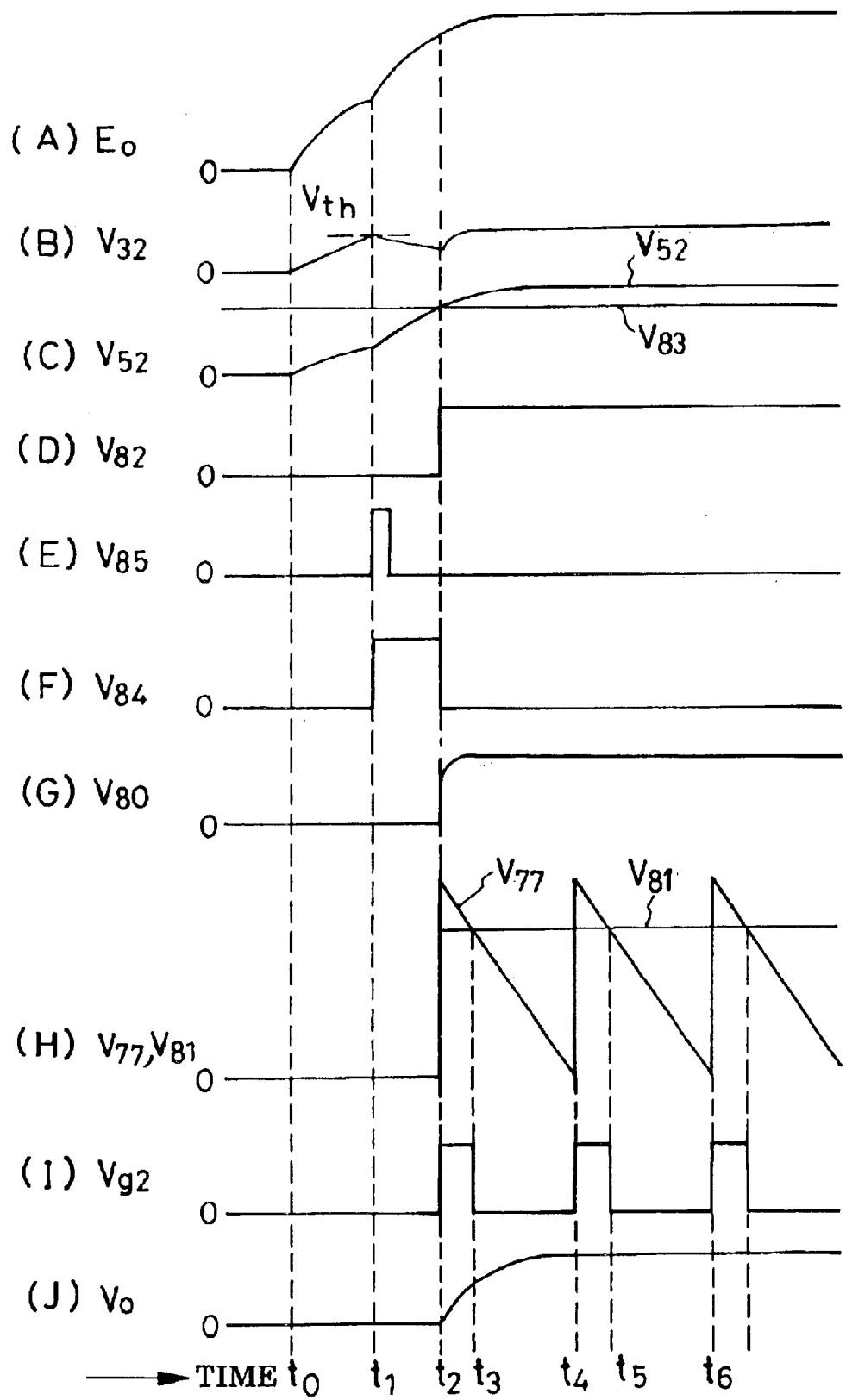
FIG. 6, consisting of (A) through (J), is a series of diagrams showing the waveforms appearing at various parts of FIGS. 2 and 5.

The various components of the first switch control circuit 44 start operation when the control voltage $V_{32}$, or the output voltage of the voltage regulator circuit 70, builds up to the threshold value of operation of each such component. The waveforms of FIG. 6 are plotted on the assumption that the first switch control circuit 44 commences steady-state operation at $t_1$. The voltage $E_0$ across the smoothing capacitor 15 will rise rapidly after $t_1$, as at (A) in FIG. 6. However, for the same reason, the voltage $V_{32}$ across the capacitor 32, FIG. 2, of the control voltage generator circuit 6 will somewhat diminish from $t_1$ to $t_2$, as at (B) in FIG. 6.

Figure 5:
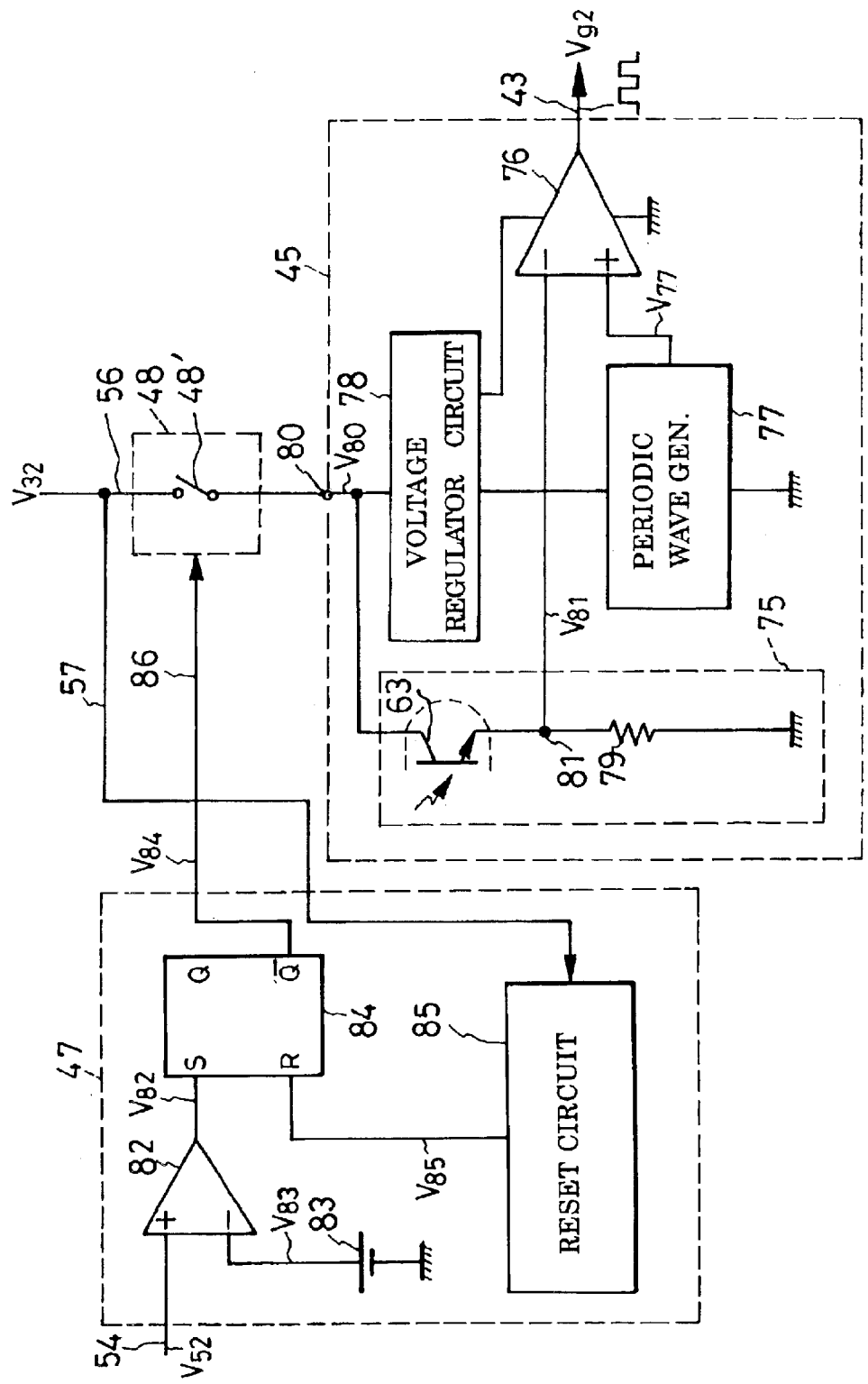
FIG. 5 is a schematic electrical diagram, partly in block form, showing the second switch control circuit, voltage decision circuit, and starter circuit of the FIG. 3 control circuit in more detail.

The reader's attention is now invited to FIG. 5 for a detailed study of the second switch control circuit 45 which functions to keep constant or in a desired value the output voltage $V_0$ of the d.c.-to-d.c. converter circuit 4 and which operates normally upon conduction of the starter circuit 48. The second switch control circuit 45 includes a voltage control signal generator circuit 75 which is shown as a serial connection of the phototransistor 63, set forth above in connection with FIG. 3, and a resistor 79. The phototransistor 63 is connected to a supply terminal 80 of this second switch control circuit 45 on one hand and, on the other hand, grounded via the resistor 79. The supply terminal 80 is connected to the starter circuit 48. When this starter circuit is conductive, therefore, the potential at the junction 81 between phototransistor 63 and resistor 79 is subject to change with the intensity of the optical input applied to the phototransistor from the LED 62, FIG. 3, of the output voltage detector circuit 49. For instance, upon increase in the optical input intensity as a result of a rise in the output voltage $V_0$ of this switching power supply, the phototransistor 63 will offer correspondingly less resistance to current flow, causing an increase in the potential at the junction 81. The potential $V_{81}$ is at the junction 81, or the voltage across the resistor 79 constitutes a signal fed back from the power supply output $V_0$ to this second switch control circuit 45 for holding output stability. The junction 81 is shown connected to the negative input of a comparator 76, although, as has been mentioned, the differential amplifier 60, FIG. 3, of the output voltage detector circuit 49 could be coupled directly to the comparator 76. The voltage control signal generator circuit 75 is a part of the output voltage detector means or the output voltage fed back means.

The comparator 76 has its positive input connected to a periodic wave generator 77 capable of generating a sawtooth, triangular or like periodic wave with a repetition frequency of, say, from 20 to 100 kHz, which is higher than the frequency of the input ac. voltage $V_{ac}$. At (H) in FIG. 6 is shown by way of example a sawtooth voltage $V_{77}$ generated by the periodic wave generator 77. The sawtooth voltage $V_{77}$ must be of sufficiently great amplitude to be traversed by the feedback voltage $V_{81}$, during steady-state operation of the d.c.-to-d.c. converter circuit 4.

After $t_2$ in FIG. 6, when the second switch control circuit 45 is powered normally, the comparator 76 will put out the switch control signal $V_{g2}$ as at (I) in FIG. 6 for delivery to the control gate of the d.c.-to-d.c. converter switch 23 over the conductor 43. Although not shown for its conventional and well-known nature, a switch driver circuit may be inserted in the conductor 43. The d.c.-to-d.c. converter switch 23 will respond to the switch control signal $V_{g2}$ by becoming conductive as from $t_2$ to $t_3$, and from $t_4$ to $t_5$, in FIG. 6.

The second switch control circuit 45 has its own voltage regulator circuit 78 for regulating the control voltage $V_{32}$ from the control voltage generator circuit 6, FIG. 2, preliminary to application to both comparator 76 and periodic wave generator 77. The supply terminal 80 of this second switch control circuit 45 may be connected directly to the comparator 76 and periodic wave generator 77 in the case where voltage regulation is not a requirement.

Such being the construction of the second switch control circuit 45, it will be seen that it will put out switch control pulses $V_{g2}$, (I) in FIG. 6, of reduced durations when the output voltage $V_0$, (J) in FIG. 6, of the d.c.-to-d.c. converter circuit rises above normal, until the output voltage returns to normal. When the output voltage $V_0$ falls below normal, on the other hand, then the switch control pulses $V_{g2}$ will widen in duration, returning the output voltage to normal.

As drawn also in FIG. 5, the voltage decision circuit 47 or the voltage comparator circuit has an input connected to the smoothing capacitor voltage detector circuit 46, FIG. 3, by way of the conductor 54 in order to ascertain whether the voltage across the smoothing capacitor 15, FIG. 2, has built up to a predefined value. Included in this voltage decision circuit 47 is a comparator 82 having a positive input connected to the smoothing capacitor voltage detector circuit 46 by way of the conductor 54, and a negative input connected to a reference voltage source 83. The comparator 82 compares the input voltage $V_{52}$ over the conductor 54, which varies in proportion with the smoothing capacitor voltage $E_0$, with the reference voltage $V_{83}$ from its source 83 and provides the binary voltage output $V_{82}$ depicted at (D) in FIG. 6. This figure shows the comparator output $V_{82}$ as going high at $t_2$ when the comparator input voltage $V_{52}$ crosses the reference voltage $V_{83}$. This reference voltage $V_{83}$ is so determined in this particular embodiment of the invention as to agree with the potential at the junction 52, FIG. 3, of the smoothing capacitor voltage detector circuit 46 when the voltage $E_0$ across the smoothing capacitor 15 is somewhat less than its rating, that is, when the voltage $E_0$ is from 35 to 95 percent of the rating, or from 200 to 400 volts.

The binary output $V_{82}$ from the comparator 82 is delivered to the set input S of a flip-flop 84, which has its reset input R connected to a reset circuit 85, and its inverting output Q connected by way of a conductor 86 to the control input of the starter circuit 48 for on-off control of a switch 48' included therein. The flip-flop 84 will be set when the comparator output $V_{82}$ goes high at $t_2$ in FIG. 6, as at (D) in this figure. The inverted output $V_{84}$ from the flip-flop 84 will go low thereupon, as at (F) in the same figure, and remain so until it is reset by the reset circuit 85, to which reference will be had later on.

The switch 48' of the starter circuit 48 takes the form of a controllable semiconductor switch or the like, so made as to conduct when the output $V_{84}$ from the flip-flop 84 is low. The switch 48' will therefore be closed at $t_2$ in FIG. 6 when the flip-flop output $V_{84}$ goes low as at (F) in that figure. Thus the voltage $V_{80}$ at the supply terminal 80 of the second switch control circuit 45 will build up to its normal value at $t_2$, setting the second switch control circuit into normal operation. Consequently, as indicated at (J) in FIG. 6, the output voltage $V_0$ of the d.c.-to-d.c. converter circuit 4 will start developing at $t_2$. The starter circuit 48 could of course be made to conduct in response to a high output; in this case, the noninverting output Q of the flip-flop 84 might be connected to the control input of the starter circuit.

The noted reset circuit 85, FIG. 5, of the voltage decision circuit 47 has an input connected to the control voltage conductor 56 by way of a conductor 57 for inputting the control voltage $V_{32}$. As indicated at (B) in FIG. 6, the control voltage $V_{32}$ will start building up at $t_0$ when the pair of a.c. input terminals 1 and 2 of this switching power supply start inputting power, or, alternately, when a supply switch, not shown, connected somewhere between input terminal 1 and inductor 12 is turned on. Upon commencement of power delivery from the rectifier circuit 11, the smoothing capacitor 15 will be charged through the circuit comprising the rectifier circuit 11, inductor 12, rectifying diode 14 and smoothing capacitor 15. The voltage $E_0$ across the smoothing capacitor 15 will build up with time as at (A) in FIG. 6. As the smoothing capacitor 15 is charged, so will be the smoothing capacitor 32, FIG. 2, of the control voltage generator circuit 6 via the starting resistor 33. FIG. 6 shows at (B) the voltage $V_{32}$ developing across the smoothing capacitor 32 with gradient from $t_0$. The reset circuit 85 is constructed to put out a reset pulse $V_{85}$, seen at (E) in FIG. 6, at $t_1$ when the developing voltage $V_{32}$ is shown to cross the threshold value $V_{th}$ at (B) in FIG. 6. Thus will the flip-flop 84, FIG. 5, of the voltage decision circuit 47 be reset at $t_1$ by the reset pulse $V_{85}$.

The reset pulse $V_{85}$ could be additionally utilized for resetting the first switch control circuit 44, FIGS. 3 and 4, at the time of startup. The first switch control circuit 44 would then begin delivering the first switch control signal $V_{g1}$ to the a.c.-to-d.c. converter switch 13, FIG. 2, at $t_1$ in FIG. 6.

The advantages gained by this first preferred embodiment of the invention, set forth above with reference to FIGS. 1–7, may be enumerated as follows:

1. The d.c.-to-d.c. converter circuit 3 can be set into operation at an optimal moment thanks to the combination of the voltage detector circuit 46 for detecting the voltage $E_0$ across the smoothing capacitor 15, the voltage decision circuit 47 for ascertaining whether the prescribed fraction $V_{52}$ of the detected capacitor voltage $E_0$ is higher than the reference voltage $V_{83}$ or not, and the starter circuit 48 for setting the d.c.-to-d.c. converter circuit 4 into operation in response to the output from the voltage decision circuit 47. Thus the d.c.-to-d.c. converter circuit 4 starts operation when its input voltage (i.e. the voltage $E_0$ across the smoothing capacitor 15) exceeds the reference voltage $V_{83}$, without the risk of instability in its output $V_0$ at the time of startup.

2. If no such improvement in the stability of the startup voltage $V_0$ as is attainable according to the instant invention is desired, then a capacitor of correspondingly less capacity, and therefore less size and less cost, than heretofore may be used in place the smoothing capacitor 15. Since the d.c.-to-d.c. converter circuit 4 starts operation when the voltage $E_0$ across the smoothing capacitor 15 builds up to a certain degree, its startup voltage will be more stable than by the comparable prior art despite use of such a smaller capacitor.

3. The a.c.-to-d.c. converter switch 13 is not connected in series with the supply conductor between rectifier circuit 11 and smoothing capacitor 15, so that the smoothing capacitor 15 can be charged before commencement of on-off operation of the switch 13.

4. The output $V_{82}$ from the comparator 82, FIG. 5, of the voltage decision circuit 47 is held by the flip-flop 84 as the hold means, precluding a suspension in the operation of the d.c.-to-d.c. converter circuit 4 in the face of possible fluctuations in the smoothing capacitor voltage $E_0$.

5. An insufficient supply of input voltage to the d.c.-to-d.c. converter circuit 4 does not occur at the time of startup because the driving of the a.c.-to-d.c. converter switch 13 starts earlier than that of the d.c.-to-d.c. converter switch 23.

6. The control circuit 5 is simplified in construction as the first switch control circuit 44 and voltage decision circuit 47 share the voltage detector circuit 46. Additionally, the control circuit 5 needs to be furnished with less terminals for voltage detection. Since the voltage detector circuit 46, voltage decision circuit 47, starter circuit 48, first switch control circuit 44 and second switch control circuit of the control circuit are mostly capable of fabrication in the form of integrated circuits, these integrated circuits are manufacturable more compactly and inexpensively by being equipped with less terminals.

7. The a.c.-to-d.c. converter switch 13 is turned on at moments determined by utilizing the inductor voltage detector circuit 21. Therefore, the first switch control circuit 44 has not a oscillator for driving the a.c.-to-d.c. converter switch 13. Consequently, the first switch control circuit 44 is reduced in size and cost.

8. The control voltage generator circuit 6 is reduced in size and cost as it makes use of the transformer 22 for providing the control voltage needed by the control circuit 5.

Figure 8:
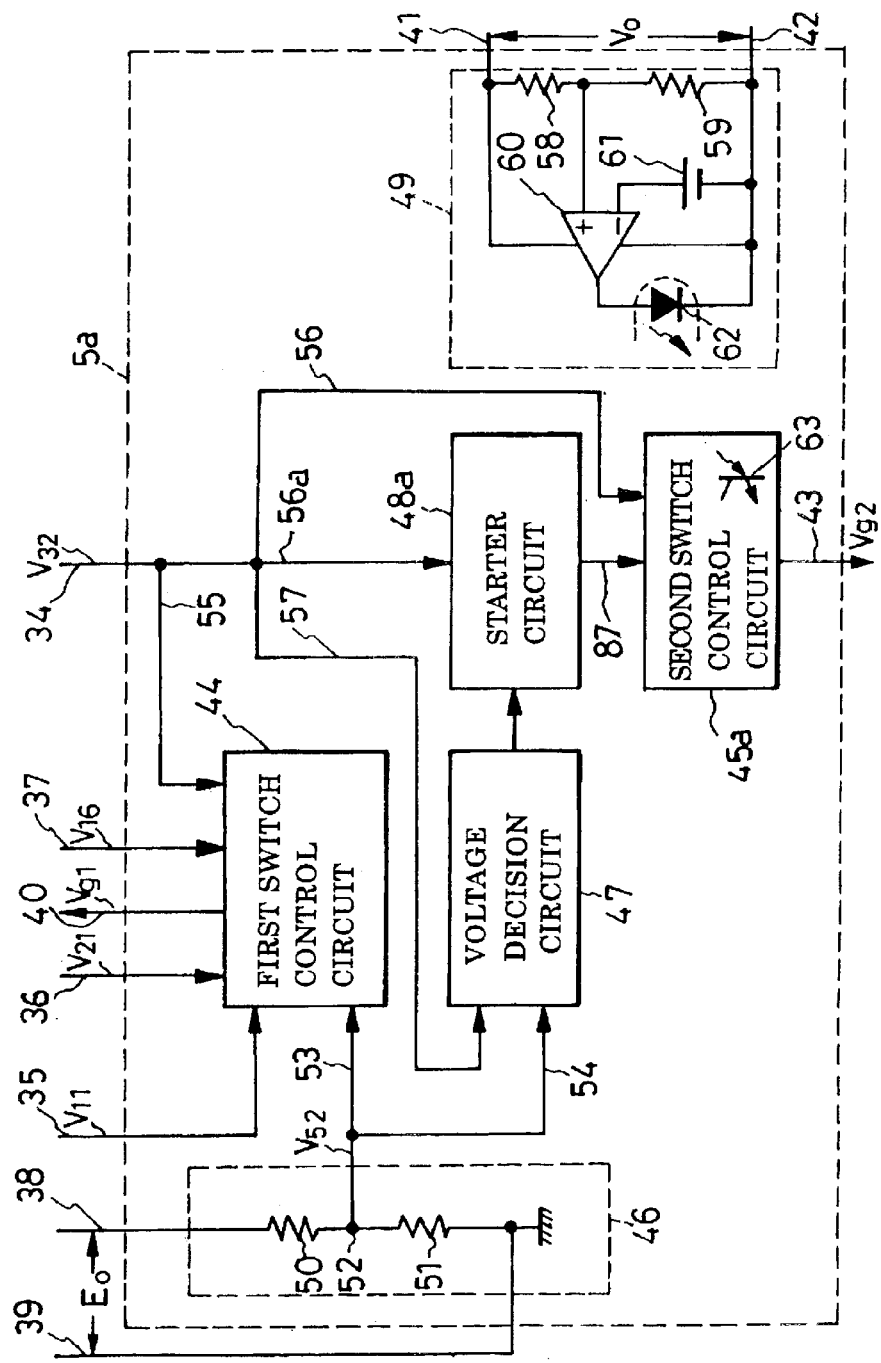
FIG. 8 is a diagram similar to FIG. 3 but showing an alternate form of control circuit for use in the FIGS. 1 and 2 embodiment in substitution for its counterpart shown in detail in FIG. 3.
Figure 9:
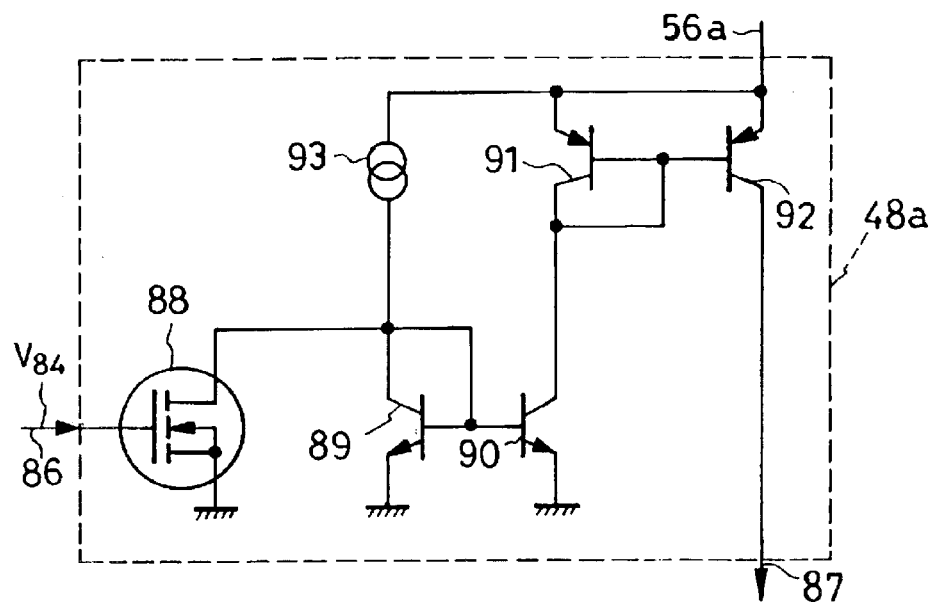
FIG. 9 is a schematic electrical diagram showing the starter circuit of the FIG. 8 control circuit in more detail.
Figure 10:
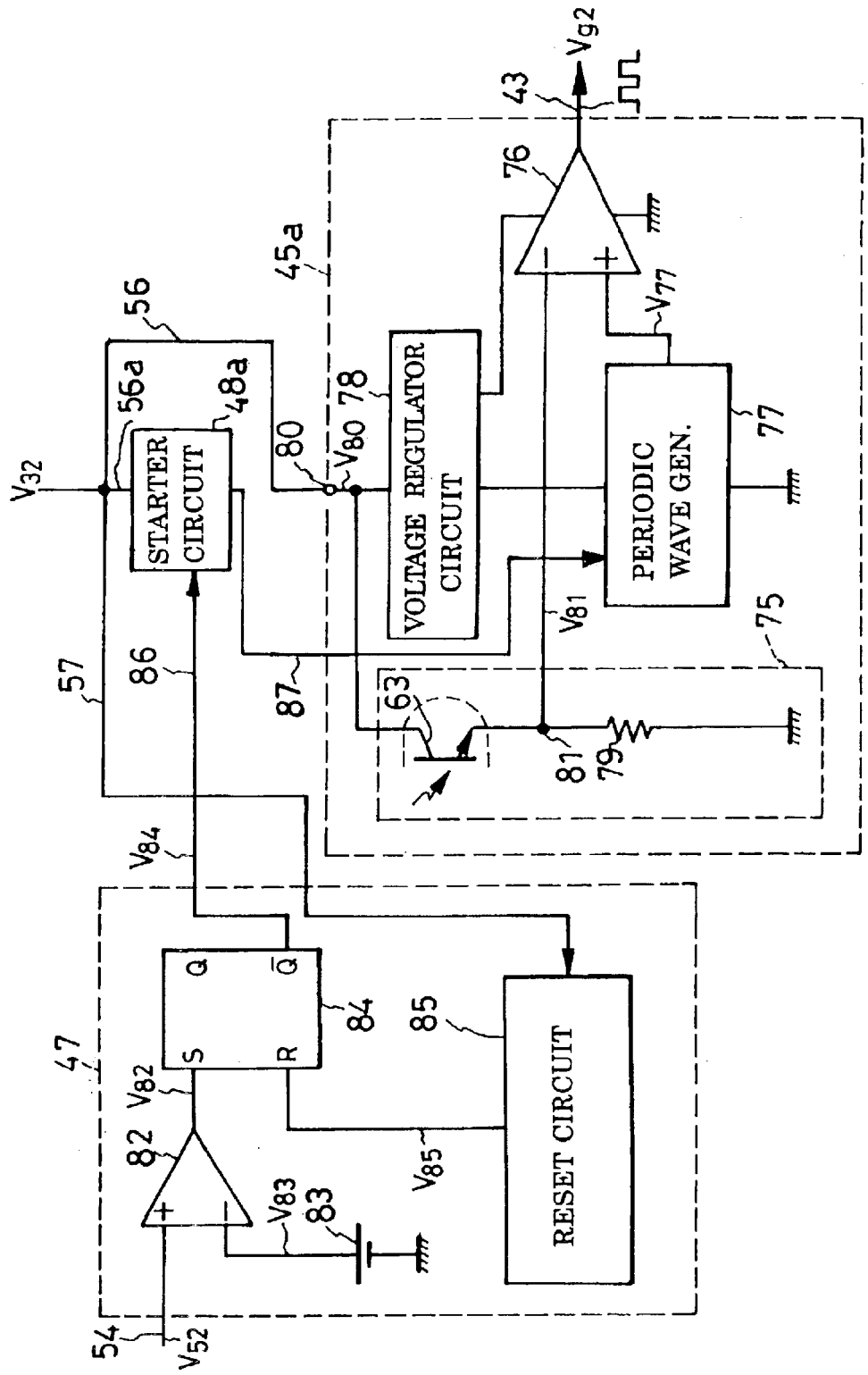
FIG. 10 is a block diagram showing the second switch control circuit and voltage decision circuit of the FIG. 8 control circuit in more detail.

Embodiment of FIGS. 8–10

Figure 12:
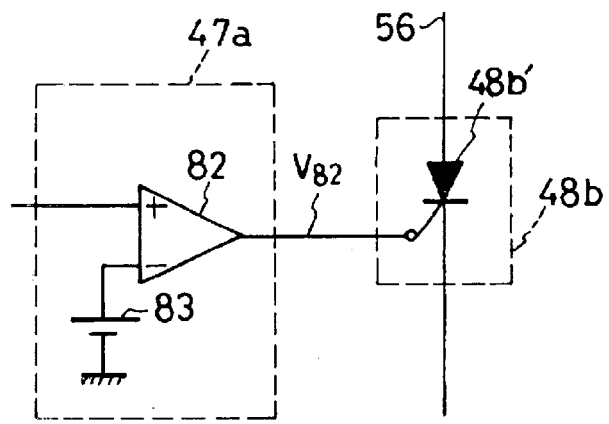
FIG. 12 is a schematic electrical diagram of a modified voltage comparator circuit and modified starter circuit for use in the FIGS. 1 and 2 embodiment in substitution for their counterparts shown in detail in FIG. 5.
Figure 11:
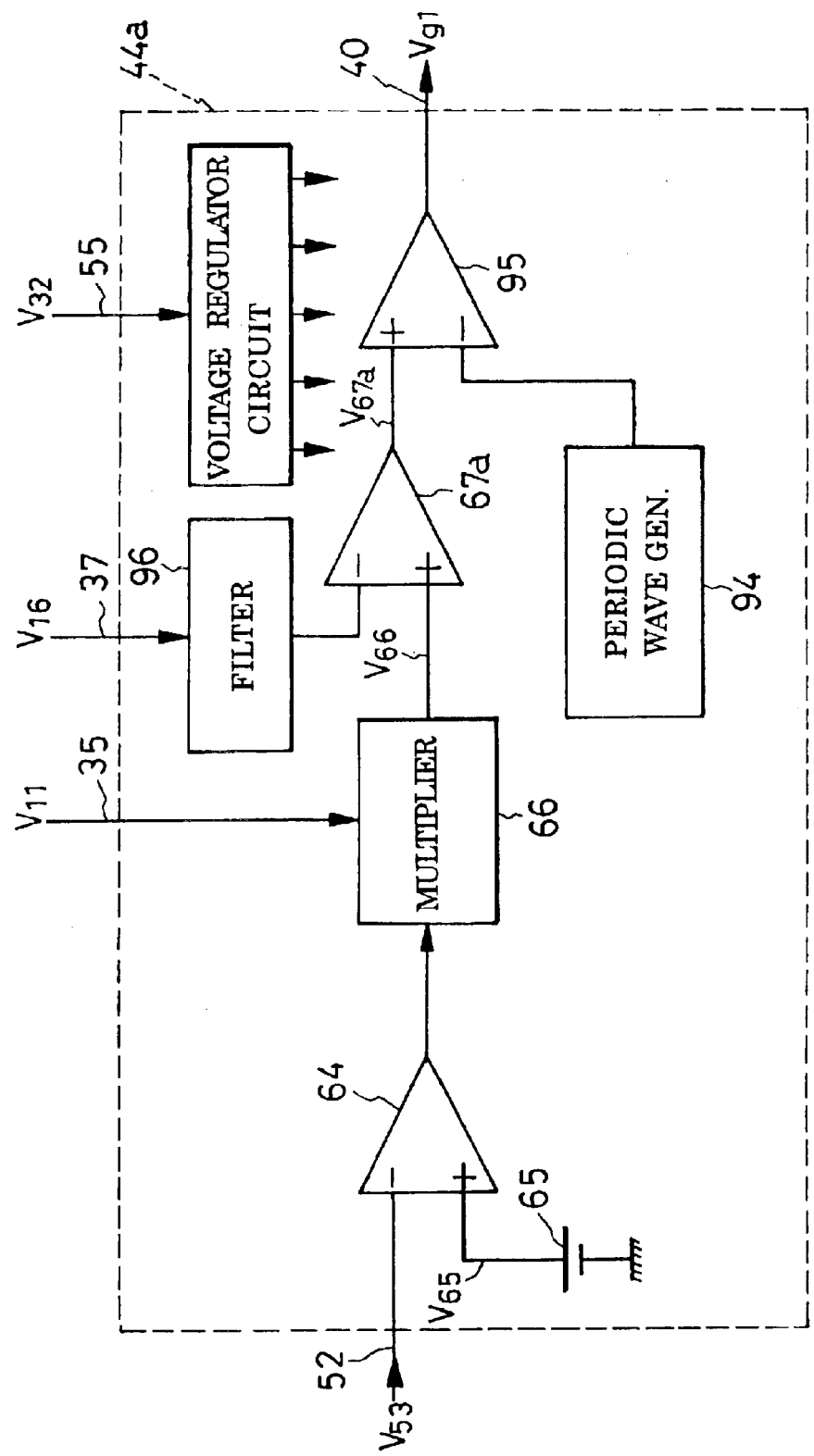
FIG. 11 is a block diagram of another alternate form of first switch control circuit for use in the FIGS. 1 and 2 embodiment in substitution for its counterpart shown in detail in FIG. 4.

A second preferred form of switching power supply according to the invention will now be described with reference to FIGS. 8–10. In this FIGS. 8-10, as well as in FIGS. 11–12 showing third to fourth embodiments of the invention, parts substantially similar to the parts shown in FIGS. 1–7 will be identified by like reference characters, and their description will be omitted. Further, in the course of the description of the second to fourth embodiments of the invention, reference will be had as required to FIGS. 1–7.

FIG. 8 shows a modification of the control circuit 5 of the preceding embodiment. The modified control circuit $5_a$ is akin to its FIGS. 3–5 counterpart 5 except that the former has a modified starter circuit $48_a$ and a modified second switch control circuit $45_a$, which are shown in detail in FIGS. 9 and 10, respectively. It will be observed from FIG. 8 that the modified second switch control circuit $45_a$ has two power supply conductors 56 and $56_a$ connected thereto. The conductor 56 connects the conductor 34 directly to the second switch control circuit $45_a$, bypassing the starter circuit $48_a$, whereas the other conductor $56_a$ connects the conductor 34 to the second switch control circuit via the starter circuit.

As illustrated in detail in FIG. 9, the modified starter circuit $48_a$ includes a field-effect transistor 88 which has its gate connected to the voltage decision circuit 47, FIGS. 8 and 10, by way of a conductor 86, its drain connected to the collector of an npn transistor 89, and its source grounded. The transistor 89 has its collector connected to the supply conductor $56_a$ via a current source 93, its emitter grounded, and its base connected to its collector. Another npn transistor 90 is provided which has its base connected to the base of the transistor 89, its emitter grounded, and its collector connected to the supply conductor $56_a$ via a pnp transistor 91. This transistor 91 has its emitter connected to the supply conductor $56_a$, its collector connected to the collector of the second mentioned npn transistor 90, and is base connected to its own collector. Another pnp transistor 92 has its base connected to the collector of the second npn transistor 90, its emitter connected to the supply conductor $56_a$, and its collector connected to the periodic wave generator 77, FIG. 10, of the second switch control circuit $45_a$ by way of a conductor 87.

The output $V_{84}$ from the voltage decision circuit 47 will go low upon development of a voltage across the smoothing capacitor 15, FIG. 2, after the switching power supply, including the modified control circuit $5_a$ of FIG. 8, has been powered on. Thereupon the FET 88 of the modified starter circuit $48_a$ will go off, causing conduction through all of the two npn transistors 89 and 90 and two pnp transistors 91 and 92. The starter circuit $48_a$ is now enabled to feed the second switch control circuit $45_a$ by way of the conductor 87.

Referring now to FIG. 10, the modified second switch control circuit $45_a$ differs from its FIG. 5 counterpart 45 only in the method in which the periodic wave generator 77 is fed. The starter circuit $48_a$ is connected only to the periodic wave generator 77 of the second switch control circuit $45_a$ in this alternate embodiment. The other components of the second switch control circuit $45_a$ are fed directly from the control voltage generator circuit 6, FIG. 2, by way of the conductor 56 bypassing the starter circuit $48_a$. The periodic wave generator 77 is constructed to form a sawtooth voltage by the periodic charging and discharging of a capacitor, not shown, included therein in this alternate embodiment. The unshown capacitor is charged from the starter circuit $48_a$ by way of its output conductor 87. Consequently the periodic wave generator 77 will start generating the sawtooth voltage $V_{77}$, seen at (H) in FIG. 6, when the starter circuit $48_a$ is turned on as above. The comparator 76 will respond to the sawtooth voltage $V_{77}$ by putting out a series of pulses $V_{g2}$ as at (I) in FIG. 6.

This second embodiment gains the same advantages as does the first. Also, it will be appreciated that the starter circuit $48_a$ of this modified control circuit $5_a$ is required to feed only the periodic wave generator 77 of the second switch control circuit $45_a$. The starter circuit $48_a$ can therefore be correspondingly reduced in current capacity.

Embodiment of FIG. 11

In FIG. 11 is given a modified first switch control circuit $44_a$ for use in the FIGS. 1 and 2 switching power supply in place of the first disclosed first switch control circuit $44_a$. A comparison of FIGS. 4 and 11 will reveal that the modified first switch control circuit $44_a$ does not have the a.c.-to-d.c. converter switch conduction-initiating circuit 68 of its FIG. 4 counterpart. The voltage-detecting coil 21, FIG. 2, is therefore unnecessary in this second alternate embodiment of the invention. Employed in lieu of the conduction-initiating circuit 68 is a periodic wave generator 94 capable of generating a voltage of sawtooth, triangular, or like periodic waveform with a repetition frequency (e.g. 20 kilohertz) higher than the frequency of the a.c. input voltage $V_{ac}$.

The first switch control circuit $44_a$ of FIG. 11 additionally differs from that of FIG. 4 in that the multiplier 66 is connected to the positive input of a subtracter $67_a$ for delivery of its voltage output $V_{66}$ set forth in conjunction with FIG. 7. The subtracter $67_a$ may take the form of a differential amplifier in practice. The negative input of this subtracter $67_a$ is connected via a filter 96 to the conductor 37 to which is applied the voltage $V_{16}$ across the current-detecting resistor 16, FIG. 2, of the a.c.-to-d.c. converter circuit 3. The voltage signal $V_{16}$ of the conductor 37 as the current detector means is a voltage signal indicative of the magnitude of the input or output current of the rectifier circuit 11. Designed to remove the high frequency component of the voltage signal $V_{16}$, the filter 96 will put out a signal with a waveform equivalent to the envelope of the input signal $V_{16}$ seen at (C) in FIG. 7. The resulting output $V_{67a}$ will be the difference between the sinusoidal output $V_{66}$ from the multiplier 66 and the pseudo-sinusoidal output from the filter 96. The filter 96.

The subtracter $67_a$ has its output connected to the positive input of a comparator 95, the negative input of which is connected to the periodic wave generator 94. The comparator 95 will put out pulses when the subtracter output $V_{67a}$ is higher than the periodic voltage from its generator 94. These output pulses of the comparator 95 constitute the switch control signal $V_{g1}$ for driving the a.c.-to-d.c. converter switch 13.

The modified first switch control circuit $44_a$ is similar in all the other details of construction to the FIG. 4 first switch control circuit 44. It offers the advantage of driving the a.c.-to-d.c. converter switch 13 with a constant frequency.

Embodiment of FIG. 12

The voltage decision circuit 47 and starter circuit 48, both shown in block form in FIG. 3 and in detail in FIG. 5, of the first disclosed embodiment, are both modifiable interrelatedly, as indicated at $47_a$ and $48_b$ in FIG. 12. The modified voltage decision circuit $47_a$ is equivalent to its FIG. 5 counterpart 47 minus the flip-flop 84 and reset circuit 85. The remaining comparator 82 has its positive input connected to the voltage detector circuit 46, FIG. 3, to receive the fraction $V_{52}$ of the smoothing capacitor voltage $E_0$, and its negative input connected to the reference voltage source 83.

The modified starter circuit $48_b$ is constituted of a thyristor which in this case may be described as a controlled rectifying device capable of holding its conducting state. The comparator 82 of the voltage decision circuit $47_a$ has its output shown connected directly to the control input of the starter circuit $48_b$, although a trigger circuit could be inserted between comparator 82 and starter circuit $48_b$. This starter circuit $48_b$ combines the functions of the starter circuit 48 and flip-flop 84 of FIG. 5, so that this FIG. 12 embodiment operates like that of FIGS. 1–5.

Possible Modifications

Notwithstanding the foregoing detailed disclosure it is not desired that the present invention be limited by the exact showing of the drawings or the description thereof. The following is a brief list of possible modifications of the illustrated embodiments which are all believed to fall within the purview of this invention:

1. The current-detecting resistor 16, FIG. 2, of the a.c.-to-d.c. converter circuit 3 could be replaced by a current transformer, a magnetoelectric converter, or the like.

2. Instead of the current through the a.c.-to-d.c. converter switch 13, the current $I_L$ through the inductor 12 or the alternating current between the pair of a.c. input terminals 1 and 2 and the rectifier circuit 11 could be detected. In the last-mentioned case the signal indicative of the alternating current detected might be rectified preparatory to delivery to the control circuit 5 or $5_a$.

3. The conductor 35, FIG. 2, could be connected to the input side of the rectifier circuit 11, instead of to its output 19, for detection of the input a.c. voltage, although in this case the a.c. voltage detected must be rectified prior to application to the control circuit 5 or $5_a$.

4. Semiconductor switches other than insulated-gate field-effect transistors shown, such for example as other types of transistors including insulated-gate bipolar transistors, could be employed as the a.c.-to-d.c. converter switch 13 and d.c.-to-d.c. converter switch 23.

5. The a.c.-to-d.c. converter circuit 3 could be of any known or suitable design other than that shown in FIG. 2 only if it was capable of power factor improvement.

6. The d.c.-to-d.c. converter circuit 3 could also be of any known or suitable design other that shown in FIG. 2. An example is a forward d.c.-to-d.c. converter in which the rectifying diode 29, FIG. 2, of the rectifying and smoothing circuit 4 conducts during the conducting periods of the d.c.-to-d.c. converter switch 23.

7. The second switch control circuit 45, FIGS. 3 and 5, could be modified for self-excitation, such that the completion of energy release from the transformer 22 is ascertained for determination the moments the d.c.-to-d.c. converter switch is turned on.

8. Instead of the comparator 82, FIG. 5, and reference voltage source 83 of the voltage decision circuit 47, a logic circuit or driver circuit could be provided which goes high only when the input $V_{52}$ exceeds a threshold voltage. This threshold value would then be equivalent to the reference voltage $V_{83}$.

What is claimed is:

1. A switching power supply capable of translating a.c. voltage into d.c. voltage, comprising:
   (a) a pair of a.c. input terminals for inputting a.c. voltage having a known frequency;
   (b) an a.c.-to-d.c. converter circuit connected to the pair of a.c. input terminals for translating the input a.c. voltage into d.c. voltage, the a.c.-to-d.c. converter circuit having power factor improvement means including an a.c.-to-d.c. converter switch;
   (c) a first switch control circuit connected to the a.c.-to-d.c. converter switch for driving the a.c.-to-d.c. converter switch at a repetition frequency higher than the frequency of the input a.c. voltage;
   (d) a d.c.-to-d.c. converter circuit connected to the a.c.-to-d.c. converter circuit for translating the d.c. voltage output of the a.c.-to-d.c. converter circuit into desired d.c. voltage, the d.c.-to-d.c. converter circuit having a d.c.-to-d.c. converter switch;
   (e) a second switch control circuit connected to the d.c.-to-d.c. converter switch for driving the d.c.-to-d.c. converter switch at a repetition frequency higher than the frequency of the input a.c. voltage;

(f) a voltage detector circuit connected to the a.c.-to-d.c. converter circuit for providing a voltage output indicative of the d.c. voltage output from the a.c.-to-d.c. converter circuit;

(g) a voltage decision circuit connected to the voltage detector circuit for ascertaining whether the voltage output of the voltage detector circuit is higher than a predefined value or not; and (h) a starter circuit connected to the voltage decision circuit and the second switch control circuit for causing the second switch control circuit to start driving the d.c.-to-d.c. converter switch when the voltage output from the voltage detector circuit grows higher than the predefined value.

2. The switching power supply of claim 1 wherein the the a.c.-to-d.c. converter circuit comprises:

(a) a rectifier circuit having a pair of input terminals connected to the pair of a.c. input terminals and a pair of output terminals for providing a rectification voltage of the input a.c. voltage;

(b) an inductor;

(c) an a.c.-to-d.c. converter switch connected between the pair of output terminals of the rectifier circuit via the inductor;

(d) a rectifier; and (e) a smoothing capacitor connected in parallel with the a.c.-to-d.c. converter switch via the rectifier.

3. The switching power supply of claim 2 wherein the d.c.-to-d.c. converter circuit comprises:

(a) a transformer having a primary winding and a secondary winding;

(b) a d.c.-to-d.c. converter switch connected between the pair of terminals of the smoothing capacitor via the primary winding of the transformer; and (c) a rectifying and smoothing circuit connected to the secondary winding of the transformer for providing d.c. output voltage.

4. The switching power supply of claim 3 further comprising a control voltage generator circuit for feeding the first and the second switch control circuit.

5. The switching power supply of claim 4 wherein the control voltage generator circuit comprises:

(a) a tertiary winding of the transformer electromagnetically coupled to the primary and the secondary winding thereof; and (b) a rectifying and smoothing circuit connected to the transformer tertiary.

6. The switching power supply of claim 1 wherein the voltage decision circuit comprises:

(a) a source of reference voltage for generating a reference voltage as the predefined value; and (b) a comparator having inputs connected to the voltage detector circuit and the reference voltage source for comparing the voltage output from the voltage detector circuit with the reference voltage.

7. The switching power supply of claim 6 wherein the voltage decision circuit further comprises means for holding the output from the comparator when the comparator indicates that the output from the voltage detector circuit is higher than the reference voltage.

8. The switching power supply of claim 7 wherein the voltage decision circuit further comprises means for resetting the holding means when the a.c.-to-d.c. converter circuit starts inputting the a.c. voltage.

9. The switching power supply of claim 4 wherein the starter circuit comprises a starter switch connected to the control voltage generator circuit and the second switch control circuit and the voltage decision circuit, for initiating power delivery from the control voltage generator circuit to the second switch control circuit when the output voltage of the voltage detector circuit grows higher than the predefined value.

10. The switching power supply of claim 9 wherein the starter switch is adapted to remain conductive following conduction in response to the output from the voltage decision circuit indicative of the fact that the output voltage of the voltage detector circuit has grown higher than the predefined value.

11. The switching power supply of claim 1 wherein the first switch control circuit is adapted to start creation of a signal for driving the a.c.-to-d.c. converter switch earlier than the second switch control circuit starts creation of a signal for driving the d.c.-to-d.c. converter switch.

12. The switching power supply of claim 1 wherein the first switch control circuit comprises voltage control means for holding constant the output voltage of the a.c.-to-d.c. converter circuit, the voltage control means being connected to the voltage detector circuit.

13. The switching power supply of claim 2 wherein the first switch control circuit comprises:

(a) a source of reference voltage for generating a reference voltage;

(b) a differential amplifier having inputs connected to the voltage detector circuit and the reference voltage source for providing an output indicative of the difference between the reference voltage and the output of the voltage detector circuit;

(c) voltage detector means connected to the input terminals or the output terminals of the rectifier circuit;

(d) compensation means connected to the differential amplifier and the voltage detector means for compensating the output of the voltage detector means by the output of the differential amplifier;

(e) current detector means for providing a voltage output indicative of the magnitude of the current through the a.c.-to-d.c. converter switch;

(f) a comparator connected to the compensation means and the current detector means for providing an output indicative of the moment the output voltage of the current detector means reaches the output voltage of the compensation means;

(g) inductor voltage detector means coupled to the inductor;

(h) an a.c.-to-d.c. converter switch conduction-initiating circuit connected to the inductor voltage detector means for providing an output indicative of the moments of initiation of conduction of the a.c.-to-d.c. converter switch when the output of the inductor voltage detector means indicates of the moments of completion of energy release from the inductor; and (i) switching pulse generator means connected to the comparator and the conduction-initiating circuit for creating a series of switching pulses for on-off control of the a.c.-to-d.c. converter switch, each switching pulse lasting from the moment of completion of energy release from the inductor to the moment the output voltage of the current detector means reaches the output voltage of the compensation means.

14. The switching power supply of claim 2 wherein the first switch control circuit comprises:

(a) a source of reference voltage for generating a reference voltage;

(b) a differential amplifier having inputs connected to the voltage detector circuit and the reference voltage source for providing an output indicative of the difference between the reference voltage and the output of the voltage detector circuit;

(c) voltage detector means connected to the input terminals or the output terminals of the rectifier circuit;

(d) compensation means connected to the differential amplifier and the voltage detector means for compensating the output of the voltage detector means by the output of the differential amplifier;

(e) current detector means for providing a voltage output indicative of the magnitude of the current associated with the rectifier circuit;

(f) a subtracter connected to the compensation means and the current detector means for providing an output indicative of the difference between the outputs therefrom;

(g) a periodic wave generator for generating a periodic wave with a repetition frequency higher than the frequency of the input a.c. voltage; and (h) a comparator connected to the subtracter and the periodic wave generator for creating a series of switching pulses for on-off control of the a.c.-to-d.c. converter switch by comparison of the subtracter output and the periodic wave.

15. The switching power supply of claim 3 wherein the second switch control circuit comprises:

(a) output voltage detector means coupled to the rectifying and smoothing circuit for providing a voltage output indicative of the d.c. output voltage of the rectifying and smoothing circuit;

(b) a periodic wave generator for generating a periodic wave; and (c) a comparator connected to the output voltage detector means and the periodic wave generator for creating a series of switching pulses for on-off control of the d.c.-to-d.c. converter switch by comparison of the output voltage of the output voltage detector means and the periodic wave.

16. In a switching power supply comprising an a.c.-to-d.c. converter circuit for translating input a.c. voltage into d.c. voltage, the a.c.-to-d.c. converter circuit having power factor improvement means including an a.c.-to-d.c. converter switch, a first switch control circuit for on-off control of the a.c.-to-d.c. converter switch with a repetition frequency higher than the frequency of the input a.c. voltage, a d.c.-to-d.c. converter circuit for translating the d.c. output voltage of the a.c.-to-d.c. converter circuit into desired d.c. voltage, and a second switch control circuit for on-off control of a d.c.-to-d.c. converter switch with a repetition frequency higher than the frequency of the input a.c., a method of driving the switching power supply which comprises:

(a) detecting the output voltage of the a.c.-to-d.c. converter circuit;

(b) comparing the detected output voltage of the a.c.-to-d.c. converter circuit with a predefined value;

(c) starting the on-off control of the a.c.-to-d.c. converter switch by the first switch control circuit; and (d) starting the on-off control of the d.c.-to-d.c. converter switch by the second switch control circuit when the detected output voltage of the a.c.-to-d.c. converter circuit proves higher than the predefined value.

* * * * *

UNITED STATES PATENT AND TRADEMARK OFFICE
CERTIFICATE OF CORRECTION

PATENT NO. : 6,842,353 B2  Page 1 of 1
DATED : January 11, 2005
INVENTOR(S) : Yamada et al.

It is certified that error appears in the above-identified patent and that said Letters Patent is hereby corrected as shown below:

Column 10,
Line 10, delete "Q" and insert therefor -- $\overline{Q}$ --.

Column 13,
Line 30, delete "The filter 96."

Signed and Sealed this

Fourteenth Day of June, 2005

JON W. DUDAS
*Director of the United States Patent and Trademark Office*